United States Patent [19]

Mashimo et al.

[11] 4,034,383

[45] July 5, 1977

[54] EXPOSURE CONTROL DEVICE

[75] Inventors: Yukio Mashimo, Tokyo; Tadashi Ito, Yokohama; Nobuhiko Shinoda, Tokyo; Nobuaki Sakurada; Fumio Ito, both of Yokohama, all of Japan

[73] Assignee: Canon Kabushiki Kaisha, Tokyo, Japan

[22] Filed: Apr. 22, 1975

[21] Appl. No.: 570,503

[30] Foreign Application Priority Data

Apr. 23, 1974 Japan .............................. 49-45814
Apr. 23, 1974 Japan .............................. 49-45815

[52] U.S. Cl. .............................. 354/23 D; 354/43; 354/50; 354/51; 354/60 R; 354/60 A; 354/242

[51] Int. Cl.² .............................................. G03B 9/62

[58] Field of Search .......... 354/23 D, 50, 51, 60 R, 354/60 A, 234, 235, 238, 243, 258, 43

[56] References Cited

UNITED STATES PATENTS

| | | |
|---|---|---|
| 3,683,767 | 8/1972 | Sahara .................................. 354/51 |
| 3,721,166 | 3/1973 | Yanagi et al. ........................ 354/51 |
| 3,748,979 | 7/1973 | Wada ................................ 354/23 D |
| 3,824,608 | 7/1974 | Toyoda .............................. 354/23 D |
| 3,827,065 | 7/1974 | Wada ................................ 354/23 D |
| 3,868,704 | 2/1975 | Yamada et al. .................... 354/23 D |
| 3,876,876 | 4/1975 | Kitai et al. ........................ 354/23 D |
| 3,889,278 | 6/1975 | Takanata et al. ................. 354/60 A |
| 3,895,875 | 7/1975 | Kitavra et al. ....................... 354/53 |

Primary Examiner—Russell E. Adams
Attorney, Agent, or Firm—Toren, McGeady and Stanger

[57] ABSTRACT

A camera in which an exposure control member is digitally controlled so as to control the exposure amount to the film plane comprising a compensating means provided for compensating the error of the exposure amount due to the response error of the operation of the exposure control member at the time of controlling the exposure control member so that the error of the exposure amount is compensated by the compensating means at the time of controlling the exposure control member.

16 Claims, 17 Drawing Figures

| SHUTTER SPEED | COMPUTATION PULSE | PULSE NUMBER FOR SHUTTER SPEED (NOTE) |
|---|---|---|
| 1/500 | 1 | 40 |
| 1/350 | 2 | 56 |
| 1/250 | 3 | 80 |
| 1/175 | 4 | 112 |
| 1/125 | 5 | 160 |
| 1/90 | 6 | 228 |
| 1/60 | 7 | 332 |

| DIAPHRAGM APERTURE | COMPUTATION PULSE | PULSE NUMBER FOR SHUTTER SPEED |
|---|---|---|
| 1.4 | 1 | 40 |
| 2 | 2 | 56 |
| 2.8 | 3 | 80 |
| 4 | 4 | 112 |
| 5.6 | 5 | 160 |
| 8 | 6 | 228 |
| 10 | 7 | 332 |

EXPOSURE CONTROL DEVICE

BACKGROUND OF THE INVENTION

1. Field of the Invention

The present invention relates to an exposure control circuit for controlling the shutter time or the diaphragm digitally.

2. Description of the Prior Art

Recently various automatic exposure control devices with digital processing have been proposed, whereby the exposure factor such as the brightness information of the object to be photographed is digitally processed and the exposure condition such as the shutter time, the diaphragm value or the like is automatically determined so as to carry out the control. Hereby the processing is carried out digitally in these automatic exposure control device so that during the processing, the accuracy is increased and the control of the shutter time, the diaphragm value or the like can be carried out with very high accuracy. However, the objects such as the diaphragm, the shutter or the like to be controled by the above mentioned digital processing in a camera are mechanically composed members accordingly, despite the accurate processing result, errors often take place in the actual value of the shutter time, the diaphragm or the like due to the errors such as the delay of the response in the mechanical members themselves. Thus, despite the digital processing with high accuracy, the actual value of the shutter time, the diaphragm or the like becomes inaccurate. This is very inconvenient.

For example, in the camera which works with a focal plane shutter, it is so designed that at winding up the focal planes, the front and the rear focal plane pass by the aperture in such a manner that the both planes overlap above each other with a certain width so that, during the winding up operation, there takes place no space between the front and the rear plane. Thus, it is generally the case that the overlapping of the front and the rear plane remains with a proper width even after the completion of the winding up. From this state, the front plane is actuated by means of the shutter releasing and then the rear plane runs so as to complete the exposure with the desired shutter time. In consequence, the starting position of the front plane does not coincide with the starting position of the rear plane in most cases by the width of the overlapping so that only by controlling the time between the start of the front plane and that of the rear plane the time necessary for the planes to run by the width of the overlapping is disregarded, which causes an error in the actual shutter time.

Further, in the case where the diaphragm member is controlled in the diaphragm control device, which is so designed that the diaphragm member is closed from the maximum value toward the minimum value while producing pulses corresponding to the diaphragm value in such a manner that when the number of pulses coincide with the number of the pulses corresponding to a certain predetermined diaphragm value, the electromagnet is excited so as to stop the closing operation of the diaphragm member and determine the diaphragm value. Theoretically, the diaphragm member can be controlled at the predetermined diaphragm value if the closing operation of the diaphragm member is stopped immediately after the pulses whose number corresponds to the above mentioned diaphragm value are produced. Actually, after the pulses whose number corresponds to the diaphragm value are produced, the closing operation of the diaphragm member is stopped so that a certain determined delay of the response takes place, for example, by the time necessary for exciting the electromagnet and therefor the diaphragm can not be set at the predetermined diaphragm value.

SUMMARY OF THE PRESENT INVENTION

The purpose of the present invention is to offer an exposure control device presenting a digital processing circuit compensated in the above mentioned error of the value such as of the shutter time, the diaphragm and so on coming from the mechanical members.

Another purpose of the present invention is to offer an exposure control device for compensating the above mentioned mechanical error by means of a digital circuit remarkably simply in its circuit construction.

Further, another purpose of the present invention is to compensate the error of the exposure time due to the overlapping of the focal planes of the focal plane shutter by means of the digital circuit.

Further another purpose of the present invention will be disclosed from the following explanation made in accordance with the accompanying drawings.

BRIEF DESCRIPTION OF THE DRAWINGS

FIG. 16 shows a table for explaining the relation between the diaphragm aperture, the computation pulses and the pulse number for shutter speed.

DESCRIPTION OF THE EMBODIMENT OF THE INVENTION

Figure 1:
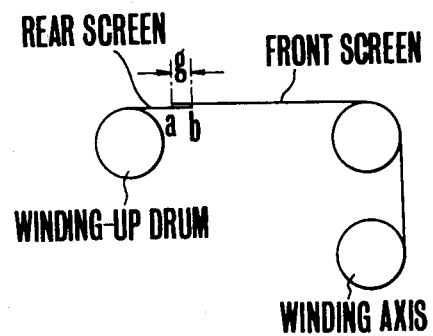
FIG. 1 shows the overlapping of the front and the rear plane at the time of winding up of the focal plane shutter.
Figure 2:
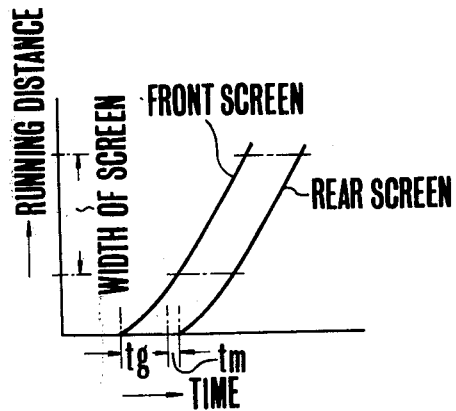
FIG. 2 shows a diagram of an example of the operation characteristics of the front and the rear plane.

FIG. 1 shows the overlapping of the front and the rear plane of the focal plane shutter, while FIG. 2 shows the diagram of the relation between the running time and the running distance of the front plane and the rear plane. In the diagram the distance between $a$ and $b$ for the overlapping of the front and the rear plane is shown with $g$, while the running time of the focal plane shutter with $tg$, and the distribution of $tg$ with $tm$. In the actual device, $tg + tm$ ranges nearly 4 m sec.± 1 m sec. which is adjusted by fine adjustment so as to increase the accuracy of the shutter time. Hereby, in case it is so designed that at the completion of the shutter winding up there takes place a slit between the front plane and the rear plane, the above mentioned $tg$ assumes a negative value.

Figure 3:
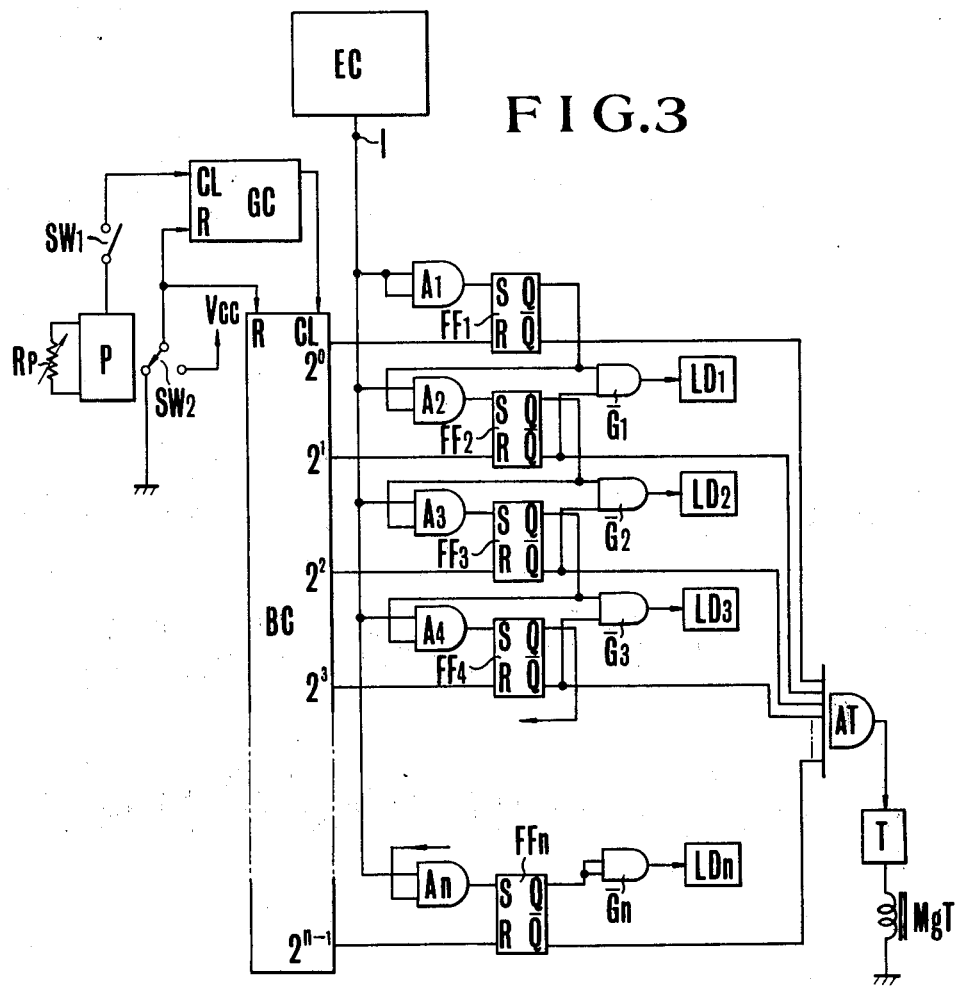
FIG. 3 shows a circuit composition of an embodiment of a digitally controlled camera by means of the fine adjusting method in accordance with the present invention.

FIG. 3 shows the circuit composition of an embodiment of the digital time circuit of the digital time circuit in accordance with the present invention, whereby in the drawing P is a standard clock pulse generator while RP the element for varying the oscillation period. $Sw_1$ is the main switch, $Sw_2$ the switch for feeding a bias for resetting, GC is the tg counter for counting the time tg for passing the width of the overlapping in FIG. 1, BC the binary counter for regenerating the actual time, $A_1$ - $A_n$ the AND gates, $FF_1$ - $FF_n$ the Flip-Flop circuits, $\bar{G}_1$ - $\bar{G}_n$ the NAND gates, $LD_1$ - $LD_n$ the indication elements such as illuminating diodes. AT is the AND gate for the putput, T the shutter driving circuit, MgT the manget for starting the rear focal plane of the focal plane shutter, EC the digital processing circuit already known for example, from the U.S. patent application Ser. No. 446,758 for processing the shutter time in Apex value in accordance with the photographic informations and with the light beam coming from the object to be photographed and producing pulses whose number corresponds to the result of the processing. I is the input terminal of the output of the digital processing circuit.

Below the operation of the digital control camera in accordance with the present invention shown in FIG. 3 will be explained. When the shutter button not shown in the drawing is pushed down to the first step, the already known digital processing circuit is brought into operation in such a manner that the pulses whose number corresponds to the shutter time processed in the Apex value is produced and put in the input terminal. Now let us think of the initial state in which the pulses has not yet been put in the input terminal, so all of the Flip-Flop circuits $FF_1$ - $FF_n$ are reset whereby the output Q assumes the value 0, and the output $\bar{Q}$ 1. When in this state, the above mentioned pulses is put in the input terminal I, the first pulse put in the input terminal I is applied to the set input S of $FF_1$ through the AND gate $A_1$, whereby the output Q of $FF_1$ is inverted into 1 and the output $\bar{Q}$ into 0. When then the next output pulse (the second pulses) is issued, the AND gate $A_2$ is closed by means of this pulse and Q 1 pulse coming from $FF_1$ in such a manner that the second pulse is put in the input S of $FF_2$. Thus $FF_2$ is inverted in such a manner that Q assumes 1 while $\bar{Q}$ 0. Every time the output pulses are issued from EC one after another, the Flip-Flop circuits $FF_1$ to $FF_2$ are set one by one in this order, in such a manner that the FF circuits whose number corresponds to the output pulses are set.

In this way, the Flip-Flop circuits whose number corresponds to that of the pulses coming from EC are set, whereby the output Q of each of the set Flip-Flop circuits assumes the value 1 while $\bar{Q}$ the value 0. By means of further pushing down the shutter button (not shown in the drawing) after the Flip-Flop are set by the above process, the front plane of the shutter starts to run by means of the conventional mechanism (not shown in the drawing). At the same time, with the start of the shutter the switch $Sw_1$ is closed the standard clock pulses are put in the input of the $tg$ counter GC of P, so as to be counted. GC is so adjusted that at the termination of counting of a certain determined number of pulses for the time $tg$ necessary for the front plane of the shutter to pass the width of the overlapping the output becomes 1, so that in a time tg after $Sw_1$ is closed the clock pulse is put in the binary counter BC. In this way, the time $tg$ corresponding to the width $g$ (FIG. 1) of the overlapping of the front and the rear plane is corrected by means of the $tg$ counter GC.

Figure 4:
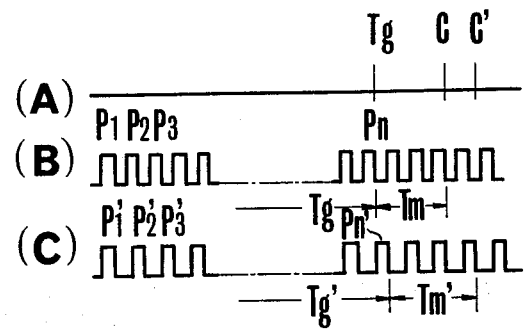
FIG. 4 shows an example of the timing chart of the device shown in FIG. 3 with wave forms.

Further in order to compensate the time $tm$ due to the error Rp is adjusted so as to vary the frequency in such a manner that the frequency corresponds to the time $tg + tm$ in which a certain predetermined pulses are counted in the counter GC whereby $tg + tm$ is compensated in the counter GC. In this way, after the time $tg + tm$ corresponding to the overlapping of the front plane and the rear plane after the start of the front plane of the shutter the counter GC starts to count the predetermined number of pulses so as to produce an output 1 whereby a clock pulse is put in the binary counter BC. Let the period of a clock pulse be chosen 1 ms (1/1000 sec.), in the first bit $2^0$ of the binary counter a reset signal is produced after 1/1000 sec. after the start of the front plane of the focal plane shutter and put in the reset input R of the Flip-Flop circuit $FF_1$, so as to reset the FF circuit. Thus the output Q is inversed into 0, while $\bar{Q}$ into 1. In case of the second bit $2^1$ of the binary counter circuit after 1/500 sec. (1/1000 × 2 = 1/500), in case of the third bit $2^2$ after 1/250 sec. (1/1000 × $2^2$ = 1/250) . . . , each one reset signal is put in the reset input of the Flip-Flop circuit one after another. When three pulses have been put in I, $FF_1$ - $FF_3$ are in the set state while $FF_4$ — are in the reset state so that $\bar{Q}$ of $FF_1$ - $FF_3$ produce an output 0 while $\bar{Q}$ of $FF_4$ — an output 1. In this state pulses are put in BC at a certain predetermined period it takes (1/1000 × $2^2$ + $tg + tm$) sec. for $\bar{Q}$ of $FF_1$ - $FF_3$ to produce 1 after the start of the front plane of the focal plane shutter, whereby at this time point the all the inputs of the AND gates are 1, so that AT are closed in such a manner that by means of the driving circuit T, MgT is operated so as to close the shutter. The above mentioned operation corresponds to that by means of the pulses (B) shown in the wave form diagram of FIG. 4, whereby every camera has its own $tg$ and $tm$, whereby when the period of the pulses are properly adjusted the time corresponding to $tg + tm$ can be adjusted in the counter GC because the period of the pulses is varied as is the case with that of the pulses (C). When the period of the pulses is varied, the period of the pulses to be put in BC and the time needed for counting is also varied, whereby when this adjustment is made at the quick shutter time side, there takes place no problem even if the period of the pulses is varied.

Figure 5:
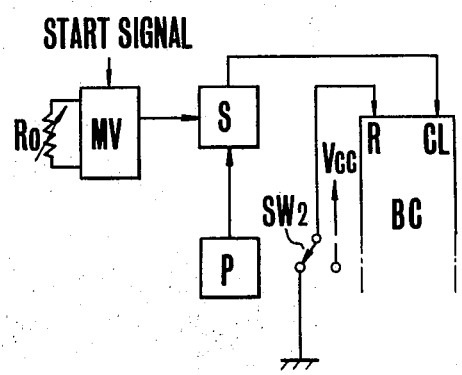
FIGS. 5 and 7 respectively show the important part of the circuit composition of further another embodiment of the present invention.
Figure 6:
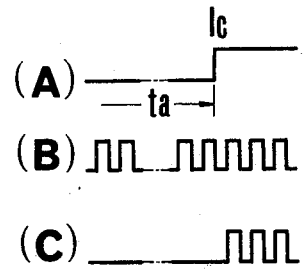
FIG. 6 shows the timing chart of the device shown in FIG. 5 with the wave forms.

FIG. 5 shows the circuit construction of another embodiment of the present invention, while FIG. 6 shows the diagram for explaining the operation of the circuit shown in FIG. 5. In the drawing MV is the monostabil multivibrator, Ro the fine adjusting element of MV, S the semiconductor switch and others are the same figures as in FIG. 3. After the shutter starting signal being put in, MV is inversed after the time tg as is shown in (A) of FIG. 6, so as to produce the output 1. Thus only the standard clock pulses (B) after the time C are put in the binary counter BC, as is shown in (C), to be counted because the switch S is opened at C. In order to effect a fine adjustment of the time ta in this circuit, it is sufficient to adjust the inversion time of MV by means of Ro. In this way, the period of the clock pulse oscillator P can be constant, whereby by means of adjusting Ro the time tg for the overlapping as well as the error tm due to the distribution can be corrected accurately in order to start the counting of the operation of the rear plane. The circuit construction as well as the operation after BC in FIG. 5 is same as that of the embodiment of FIG. 3, so that the explanation is omitted.

Figure 7:
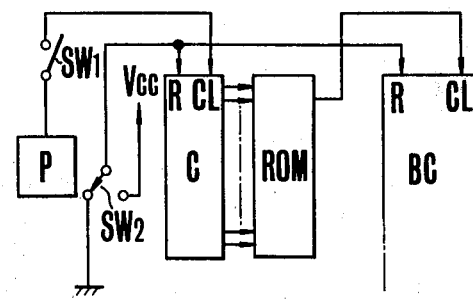

In case of the embodiment shown in FIG. 7 instead of the counter GC of tg an n-bit counter and its ROM are adopted whereby in this circuit the clock pulses with constant period are counted in the n-bit counter C in such a manner that when the count reaches no error or the range within allowance of the shutter speed set in ROM the output is sent to the binary counter BC. Namely, the error of the shutter time is corrected by changing the setting of ROM. Other circuit construction as well as the operations are the same as of the embodiment shown in FIG. 3, so that the explanation is omitted.

Figure 8:
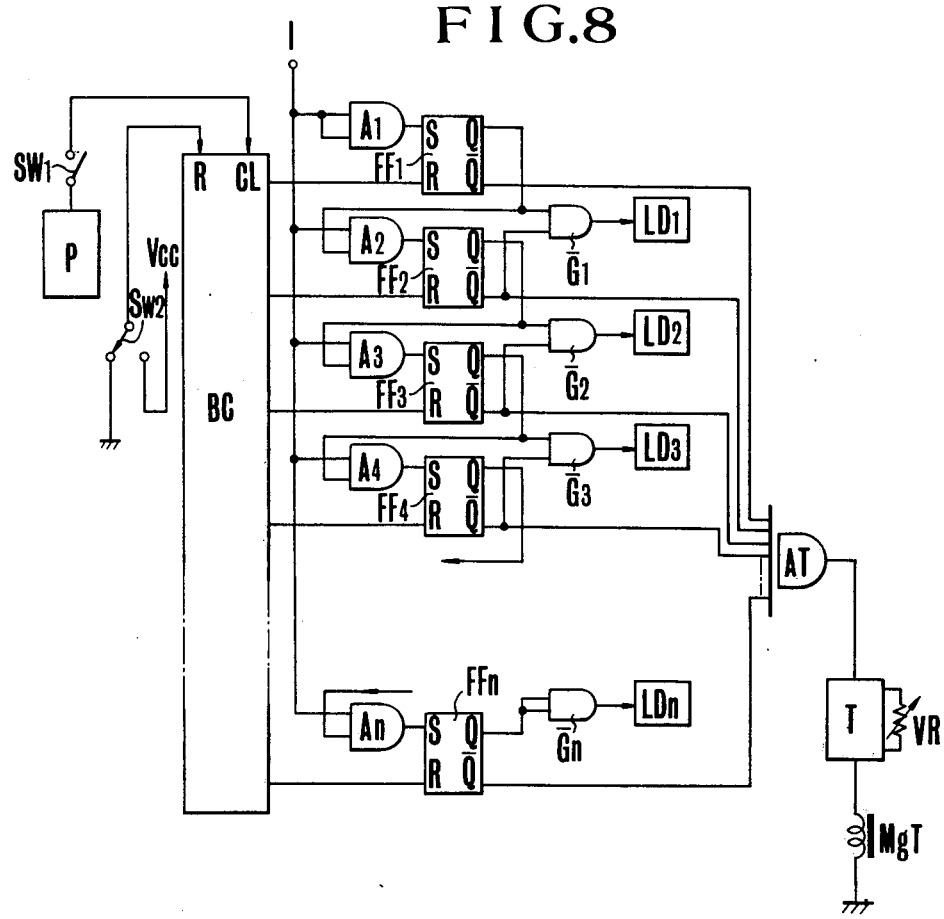
FIG. 8 shows a circuit diagram of another embodiment of the digitally controlled camera by means of the fine adjusting method in accordance with the present invention.
Figure 9:
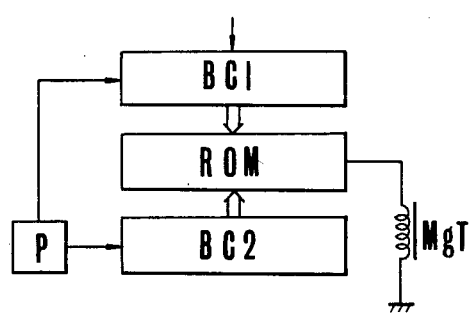
FIG. 9 shows a basic circuit diagram of further another embodiment of the present invention.
Figure 10:
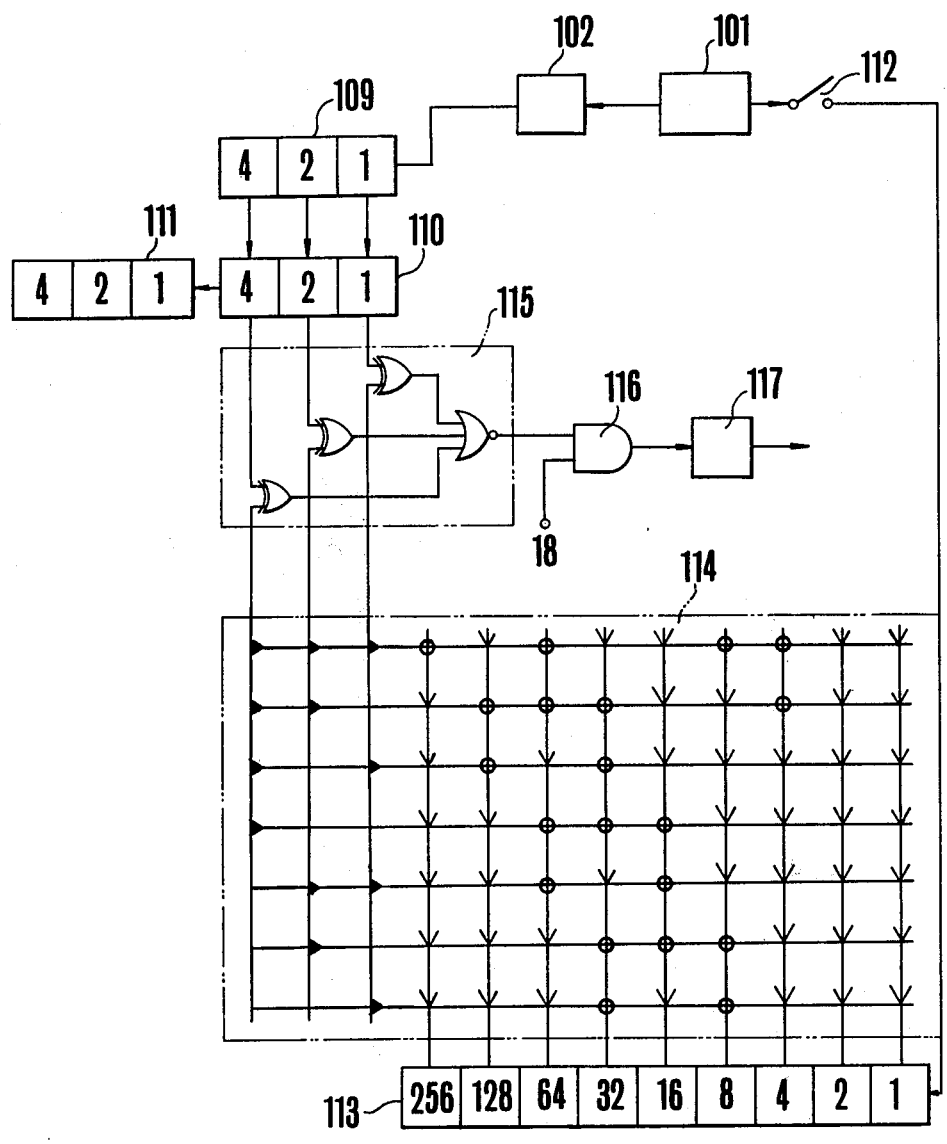
FIG. 10 shows an embodiment of the basic circuit diagram shown in FIG. 9.

FIG. 8 shows the circuit diagram of further another embodiment of the present invention whereby the circuit members with the same efficiency and the same operation as of the embodiment shown in FIG. 3 is shown with the same figures while instead of the counter GC shown in FIG. 3, a delay circuit T' such as monostabil multivibrator for making a delay of a certain predetermined time is provided at the output terminal of the AND circuit AT, whereby by means of this T' after a certain predetermined delay after the AND circuit AT is closed the magnet MgT for controlling the rear plane of the focal plane shutter is driven while the delay of the delay circuit T' is adjusted by means of the variable resistance VR so as to compensate tg + tm by making the delay time correspond to tg + tm. The operation of the embodiment shown in FIG. 8 is almost the same as of that shown in FIG. 3 so that the detailed explanation is omitted, whereby when the switch $Sw_1$ is closed the front plane of the focal plane shutter is let to run while at the same time, the pulse signal is put in the binary counter and then after the predetermined delay by means of T' after the AND circuit AT is closed the MgT is driven. FIG. 10 shows a circuit diagram of an embodiment of the device shown in FIG. 9, whereby in the drawing 101 is the standard pulse generator for continuously generating short pulses with a certain predetermined period, 102 the input converting device presenting for example, the construction shown in FIG. 11, whereby the light beam is logarithmically and photoelectrically converted by means of the processing amplifier 203, the light sensing element 204 and the logarithmic diode 205 into a photoelectrically converted output which is integrated by means of the integrating circuit 200 consisting of the condensor 207 and the processing amplifier 206 at the same time with the opening of the switch which opens in functional engagement with the opening of the current source switch not shown in the drawing. 209 is the comparator whose negative input terminal is connected with the output terminal of the above mentioned integral circuit which the other positive input terminal is connected with the standard voltage 210 presenting the value corresponding to the addition of the logarithmically compressed diaphragm value Av and of the value inversed Sv' of the logarithmically compressed ASA sensitivity value, namely Av + Sv'. 211 is the AND circuit being connected with the output terminal of the comparator 209 and that of the above mentioned pulse generator 101. 109 is the processing counter being connected with the output terminal of the AND circuit 211 and with the storage circuit 110. 111 is the indication device for indicating the content stored in the storage circuit. 172 is the switch which closes at the same time with the pushing down of the shutter button not shown in the drawing, 113 the shutter time counter and 114 the comparison circuit of the matrix construction for comparing the pulse number counted in the shutter time counter 113 with the pulse number counted in the processing counter according to a certain preset relation. 115 is the coincidence circuit for detecting the coincidence of the pulse signal coming from the comparison circuit with the pulse signal coming from the above mentioned storage circuit whereby when the both pulse signals coincide with each other an output signal is supplied to the shutter relay 117.

Figure 11:
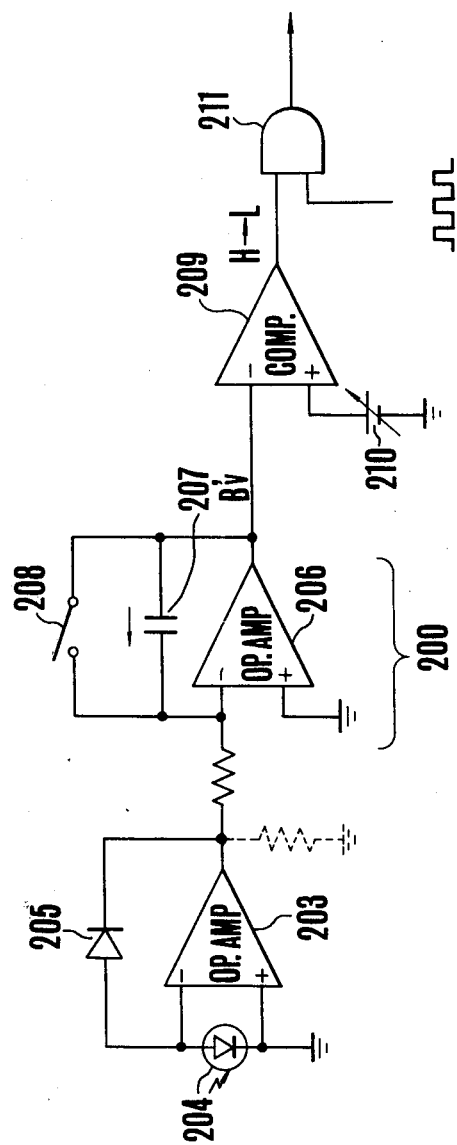
FIG. 11 shows a circuit diagram of an embodiment of the input converting device 102 shown in FIG. 10.
Figures 12, 13:
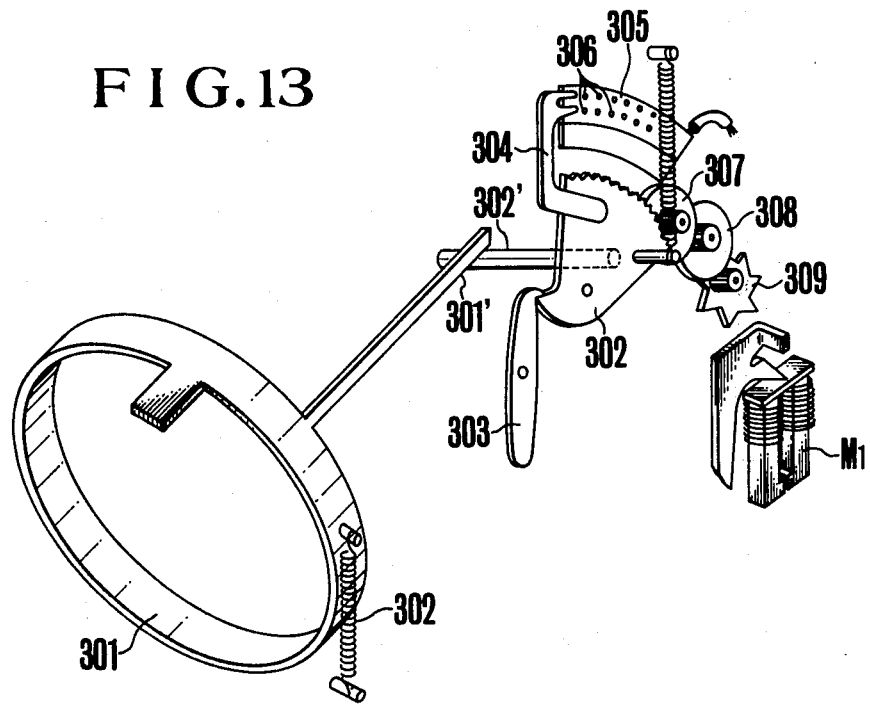
FIG. 12 shows an example of the table of the shutter speed and the computation pulse for explaining the embodiment.
FIG. 13 shows an embodiment of the diaphragm mechanism in case the digitally controlled camera in accordance with present invention is used for controlling the diaphragm.

Below the operation of the embodiments shown in FIG. 10 and FIG. 11 will be explained. When the current source switch not shown in the drawing is opened, the switch 208 is opened in functional engagement with the current source switch. On the other hand, the light beam received by the light sensing element 204 produces the corresponding voltage which is logarithmically compressed by means of the logarithmic diode 205 and the processing amplifier 203 and is applied to the negative input terminal of the integrating circuit 200. The logarithmically compressed voltage is integrated in the integrating circuit 200 and applied to the negative input terminal of the comparator 209. To the positive input terminal of the comparator 209 the standard voltage corresponding to the sum of the Av value and the Sv' value is applied so as to be compared with the voltage put in the negative input of the comparator 209. The voltage applied to the negative input terminal of the comparator 209 varies proportionally to the light beam, so that when the light beam is strong the standard voltage is reached in a short time while the light beam is weak the standard voltage is reached in a long time. When the values of the both input of the comparator 209 coincide with each other the comparator is brought out of operation so as to stop the output for the one input terminal of the AND circuit. Thus the AND circuit 211 is brought out of operation. Because further the AND circuit is connected with the standard pulse generator 101, the pulse signals pass the AND circuit 211 until the comparator 209 is brought out of operation so as to be applied to the processing counter 109 and counted in binary way in such a manner that the count number is stored in the storage circuit 110. Therefore, in the storage circuit the shutter time value corresponding to the brightness of the object to be photographed is stored. Further by means of the digital indication circuit 111 the shutter time value is indicated. In case the relation between the pulse number put in the processing counter 109 from the AND circuit and the shutter time represented by the pulse number is as is shown in FIG. 12, when five pulses are put in the counter 109, in which the fourth position and the first position are set 1, the shutter time of 1/125 sec. is shown. When as mentioned above after 101 is set in the counter the shutter is released, the front plane of the focal plane shutter runs in functional engagement with the shutter release while at the same time the switch 112 is closed whereby the standard clock pulses are put in the shutter time counter 113 from 101. Now, let the standard clock pulses be 50 $\mu$ sec. (20 KHZ), when 160 clock pulses are counted in the counter 113, 8 m sec., namely 1/125 sec. are obtained, whereby because the 128 the position and the 32nd position of the counter 113 present the value 1, the third line of the comparison circuit 114 is closed and this information and 101 of the above mentioned storage circuit 110 are detected in the coincidence output circuit in such a manner that both coincide with each other an output signal is produced to drive the shutter closing relay 117 so as to start the rear plane with the shutter time of 1/125 sec. In order to compensate the error time $tg + tm$ corresponding to the overlapping of the front plane and the rear plane in the present circuit it is sufficient to provide gates on the counter 1 or 2 or the lines 1 and 2, for example, when $tg + tm$ is 100 $\mu$ sec. it is sufficient for the coincidence output circuit 115 to produce the output delayed by two pulses so that when on the line of the position 2 of the counter 113 the gate is provided every line is closed in the state delayed by two pulses so that $tg + tm$ is compensated. The embodiment explained in detail above is to compensate the error due to the overlapping the shutter planes, whereby the responce delay of the magnet can also be compensated in the same way as the compensator of the overlapping of the shutter planes. Hereby in the above mentioned embodiment, the shutter time is compensated in order to compensate the overlapping of the shutter planes, while it goes without saying that the compensation can be effected by driving the diaphragm by the pulses corresponding to the error.

Figure 14:
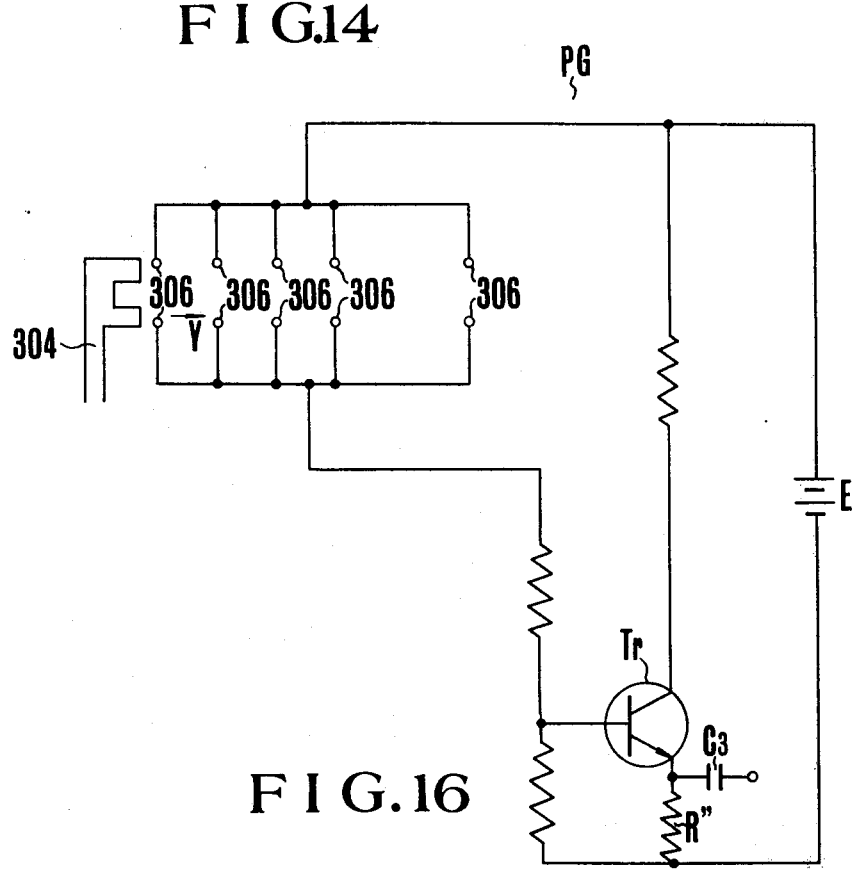
FIG. 14 shows a pulse generating circuit for producing pulses whose number corresponding to the aperture of the diaphragm to be controlled by means of the diaphragm mechanism shown in FIG. 13.

FIGS. 13, 14, 15 and 17 show further another embodiment of the exposure control device in accordance with the present invention, whereby in the embodiment the case of the diaphragm control is shown. FIG. 13 shows the composition of the diaphragm member for determining the diaphragm value, whereby 301 is the diaphragm ring being connected with the diaphragm blades not shown in the drawing and pushed clockwise by means of the spring 302 in such a manner that by rotating the diaphragm ring clockwise the diaphragm blades not shown in the drawing is closed from the fully opened state toward the smallest state. 302 is the principal driving sector gear, whereby the gear presents a pin 302' fixed at the one end in such a manner that the pin 302' engages with the lever 301' at the one end of the diaphragm ring 301, whereby the sector gear 301 rotates clockwise by the rotation of the diaphragm ring 301. 303 is the stopping lever being engaged with the end face of the gear 303 so as to prevent the gear 302 from rotation. 304 is the slide member fixed on the sector gear in such a manner that the slide member is slidable on the resistance body 306 cemented on the insulation plate 305. 307 – 309 are the reduction gear group composing a goverver gear whereby on the wheel 309 in the last step a stopping lever 310 is provided whose one end is attracted by a permanent magnet attached to an electromagnet $M_1$ in such a manner that when the electromagnet $M_1$ is excited the other end of the lever 301 prevents the rotation of the wheel 309. FIG. 14 shows a circuit diagram showing the pulse generator PG being connected with the slide member 304 and resistance body 306 shown in FIG. 13, whereby 304 and 306 are the slide member and resistance body in FIG. 14. The slide member slides along the direction of the arrow Y in functional engagement with the rotation of the diaphragm ring in FIG. 13, so as to produce pulses corresponding to the diaphragm value by contacting with the resistance body. Tr is the transistor which is closed when the contact is in touch with the above mentioned slide member so as to produce an output. C is the condensor forming a differentiating circuit together with the resistance $R''$ in such a manner that the output of the transistor Tr is differentiated by the circuit so as to produce pulses. E is the current source.

Figure 15:
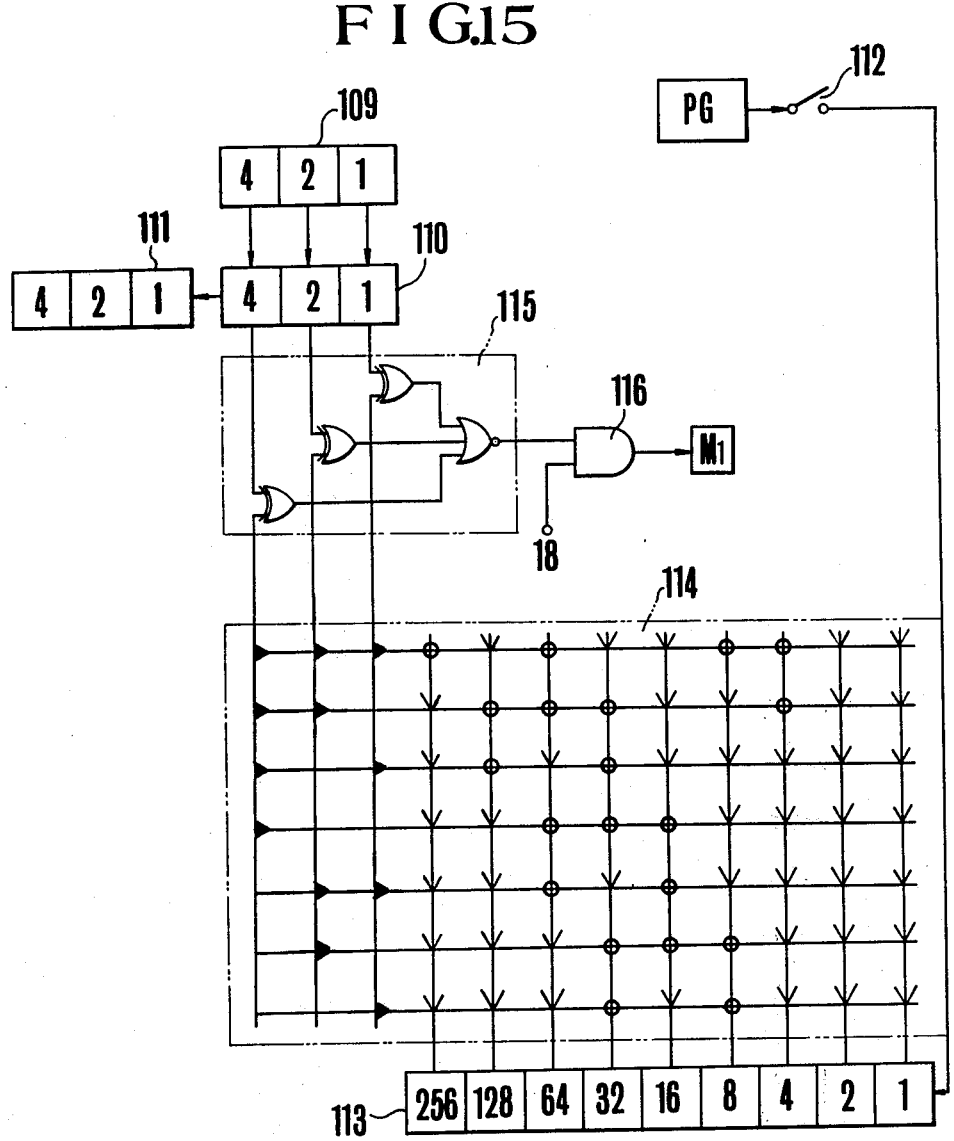
FIG. 15 shows a diagram of a circuit to be used for controlling the diaphragm shown in FIG. 13.
Figure 17:
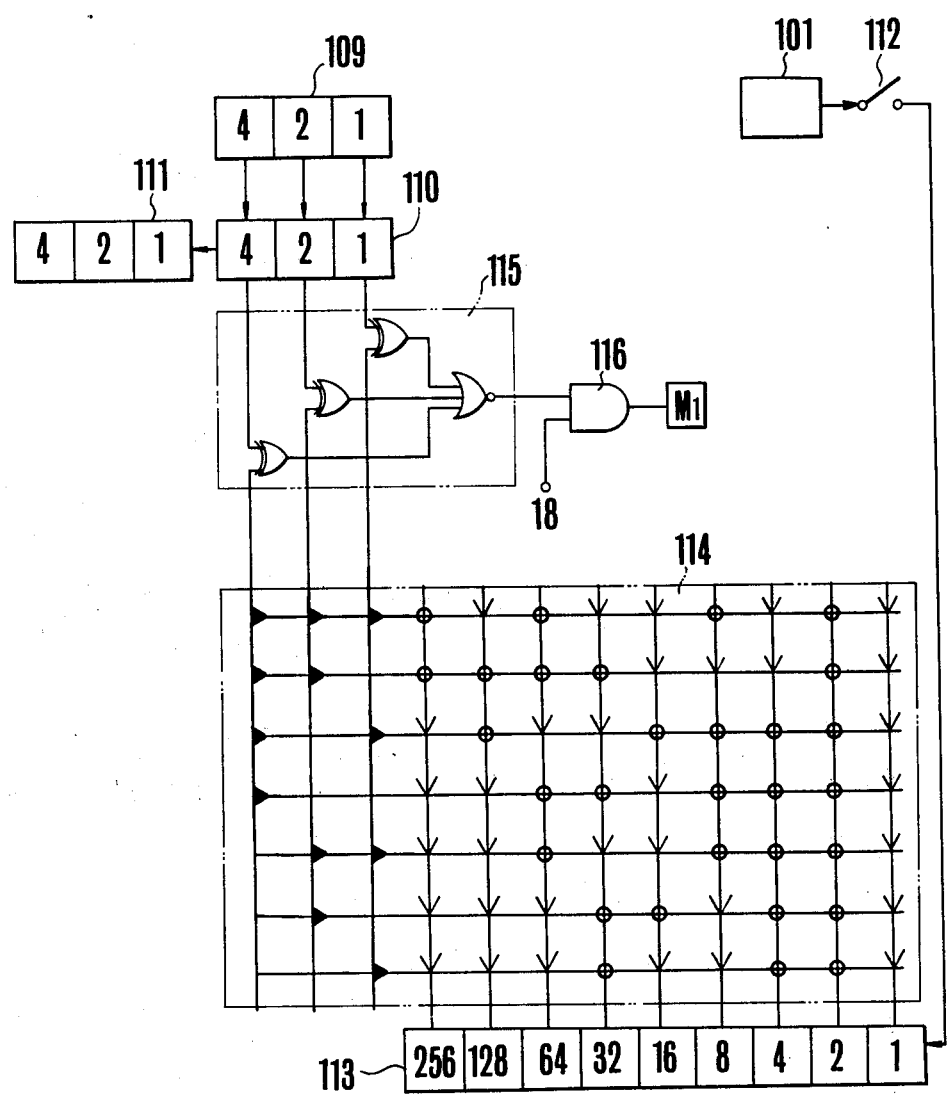
FIG. 17 shows a circuit diagram for showing another embodiment of the comparison circuit shown in FIG. 15.

FIG. 15 shows an embodiment of the diaphragm control circuit whereby PG is the pulse generator as is shown in FIG. 14, 112 a switch closing in functional engagement with the stopping lever 303, $M_1$ the electromagnet as is shown in FIG. 13 and other members the same as shown in FIG. 10, whereby the members present the same figures. In case the relation between the content of the storage circuit 110 and the pulses to be counted by the diaphragm counter 113 is as is shown in FIG. 16 and for example, second position of the storage circuit 110 is set 1, whereby the digital quantity corresponding to the value of F2, the pulse number corresponding to F2 is 56, the diaphragm ring 301 is rotated clockwise after the gear 302 is released, 56 pulses from the pulse generator PG are counted by the counter 113, then the coincidence output circuit 115 produces an output, the electromagnet $M_1$ shown in FIG. 13 is excited, the attraction of the stopping lever 310 by means of the permanent magnet is released, the gear 302 is brought out of rotation by engaging the stopping lever 310 with the wheel 309 and then the closing operation of the diaphragm blades is stopped by means of the diaphragm ring so as to obtain the aperture, F2. Further, when the diaphragm blades are closed from the fully opened state toward the smallest state by starting the rotation of the diaphragm ring and the gear 302 by means of the stopping lever 303, the diaphragm value is varied in accordance with the pulse number counted by the counter 113, so that the diaphragm value is determined by the pulse number from the disengagement of the gear out of the stopping lever upto the production of the output from the coincidence output circuit 115. However, it takes a certain determined time from the production of an output from the coincidence output circuit 115 till the electromagnet is excited and the stopping lever brings the wheel 309 out of rotation, so that the actual aperture is smaller than that of the diaphragm value determined by the storage circuit 110. Consequently, in accordance with the present invention, the value of the pulses counted by the counter 113 is converted by the comparison circuit 114 into the pulse number corresponding to the sum of the counted pulse number and a certain predetermined pulse number in such a manner that before the pulse number corresponding to the content of the storage circuit 110 is counted by the counter 113, an output is produced by the above mentioned coincidence output circuit so the time needed for the excitation of the electromagnet and the time needed for stopping the rotation of the wheel by means of the stopping lever are compensated and the aperture is controlled to the diaphragm value corresponding to the content normally stored in the storage circuit correctly. For example, in case as mentioned above the second position of the storage circuit is set 1 and a digital quantity corresponding to the value of F2 is stored, although originally after the pulse number 56 are counted the output from the coincidence output circuit is applied to the electromagnet $M_1$ so as to excite the electromagnet $M_1$, after the stopping lever releases the gear and the pulse number 54 are counted, whereby the comparison circuit is composed as is shown in FIG. 17, a signal from the coincidence output circuit excites the electromagnet $M_1$ in such a manner that the time needed for counting two pulses by the counter corresponds to the time from the production of the output by the coincidence match circuit till the stop of the rotation of the diaphragm whereby the diaphragm determined by the storage circuit can be made equal to the actual diaphragm value.

As explained above by means of the exposure control device presenting the digital circuit in accordance with the present invention the time error in the mechanical system of the camera contributing much to the determination of the exposure conditions such as the overlapping of both focal planes is compensated by the digital control so that it can be said the present invention is very profitable, being capable of an exposure control with high accuracy.

What is claimed is:

1. An exposure control circuit comprising:
    a. a shutter screen containing a shutter front screen and a shutter rear screen;
    b. a shutter time control circuit, containing:
        1. a pulse forming circuit to form pulses with prescribed constant cycle,
        2. a computation circuit to compute pulses from said pulse forming circuit, and
        3. a shutter control means to control the running of the shutter front screen and the shutter rear screen based on the computed value of said computation circuit;
    c. a compensation circuit coupled to said computation circuit, wherein said compensation circuit is for reducing the number of pulses provided by said pulse forming circuit so as to transmit the same to said computation circuit; and
    d. an insertion means to insert the amount of pulse reduction corresponding to the amount of overlapping of shutter screens into said compensation circuit as an analog electrical amount;
whereby the number of pulses are reduced based on the amount of overlapping of shutter screens and are transmitted to the computation circuit, and accordingly, shutter time is adjusted.

2. A circuit according to claim 1, in which said compensation circuit contains a timer means to function in synchronism with the running of the shutter front screen and to generate an output after a length of time corresponding to the amount of overlapping of the shutter screens and a computation control means to provide pulses from said pulse forming circuit into said computation circuit in response to the output of said timer means.

3. A circuit according to claim 2, in which said insertion means is a time constant element to control the functioning time of said timer means.

4. A circuit according to claim 2, in which said timer means is a multiple vibrator.

5. An exposure control circuit comprising:
    a. a shutter screen containing a shutter front screen and a shutter rear screen;
    b. a shutter time control circuit, containing:
        1. a pulse forming circuit to form pulses with a prescribed constant cycle;
        2. a computation circuit to compute pulses from said pulse forming circuit, and
        3. a shutter control means to control the running of the shutter front screen and the shutter rear screen based on the computed value of said computation circuit;
    c. a compensation circuit coupled to said computation circuit, for reducing the content of said computation circuit; and
    d. an insertion means to insert the amount of reduction of said computation circuit into the compensation circuit as a digital conversion amount corresponding to the amount of overlapping of shutter screens.

6. A circuit according to claim 5, in which said compensation circuit is a code conversion circuit to convert the content of said computation circuit to another code.

7. A circuit according to claim 6, in which said insertion means is a gate means so as to compose a code conversion circuit.

8. An exposure control circuit comprising:
    a. a shutter screen containing a shutter front screen and a shutter rear screen;
    b. a shutter time control circuit, containing:
        1. a pulse forming circuit to form pulses with a prescribed constant cycle,
        2. a computation circuit to compute pulses from pulse forming circuit, and
        3. a shutter control means to control the running of the shutter front screen and the shutter rear screen based on the computed value of said computation circuit, and
    c. a counter means connected to said computation circuit, wherein said counter means reduces the number of pulses provided by said pulse forming means based on the amount of overlapping of shutter screens and transmits the same to said computation circuit.

9. An exposure control device comprising:
    a. a shutter means, said means comprising:
        1. a first curtain movable from a cocked position to a rest position for initiating film exposure, and
        2. a second curtain movable from a cocked position to a rest position for terminating the film exposure, the trailing edge portion of said first curtain and the leading edge portion of said second curtain overlapping one another with said first and second curtain in said cocked positions;
    b. a means for releasing said second curtain from said cocked position after a time delay;
    c. a timing device for determining said time dealy and controlling said means for releasing, said timing device comprising:
        1. a digital time forming circuit including a pulse generating means for producing clock pulses and a counter for counting pulses produced by the pulse generating means, said digital time forming circuit forming a time corresponding to the number of pulses counted by the counter, and 2. a time compensating circuit for adjusting a time lapse delay caused by the overlapping of said first and second curtains in said cocked position, said time compensating circuit being connected with the digital time forming circuit in such a manner that said time delay is determined by the digital time forming circuit and the time compensating circuit.

10. A device according to claim 9, in which said time compensating circuit reduces the pulses from said pulse generation means corresponding to the amount of overlapping of shutter screens and transmits the same to said counter.

11. A device according to claim 10, in which the control circuit comprises a counter while an oscillator being connected with the counter for producing clock pulses is provided in such a manner that the clock pulses are counted by the counter, whereby the exposure control means is digitally controlled in accordance with the time used for counting pulses while the compensating means comprises a delay circuit, whereby the delay time of the delay circuit is added to the time used for counting by the counter by the delay circuit.

12. A device according to claim 10, in which the time compensating circuit is connected between the pulse generating means and the counter in such a manner that the clock pulses are supplied to the counter after the time lapse delay by means of the time compensating circuit.

13. A device according to claim 10, in which the time compensating circuit comprises a delay circuit for producing an output after a certain predetermined time and a gate means closing by means of the output, whereby the clock pulses are supplied to the counter through the gate after the time determined by the delay circuit.

14. An exposure control circuit comprising:
a. a diaphragm control means to control diaphragm aperture value;
b. a diaphragm control circuit, containing:
1. a pulse forming circuit to form pulses with a prescribed uniform cycle,
2. a computation circuit to compute pulses from said pulse forming circuit, and
3. an electro-magnetic means to stop the function of the diaphragm control means based on the computation value of said computation circuit;
c. a compensation circuit coupled to said computation circuit, wherein said compensation circuit reduces the number of pulses provided by said pulse forming circuit so as to transmit the same to said computation circuit; and
d. an insertion means to insert such reduction amount of pulses corresponding to the amount of delay in response of said electro-magnetic means into said compensation circuit as an analog electrical amount.

15. An exposure control circuit comprising:
a. a diaphragm control means to control diaphragm aperture value,
b. a diaphragm control circuit, containing:
1. a pulse forming circuit to form pulses with a prescribed uniform cycle,
2. a computation circuit to compute pulses from said pulse forming circuit, and
3. an electro-magnetic means to stop the function of the diaphragm control means based on the computation value of said computation circuit;
c. a compensation circuit connected to said computation circuit, for reducing the content of said computation circuit; and
d. an insertion means to insert the amount of reduction by said compensation circuit into the compensation circuit as a digital conversion amount corresponding to the amount of delay in response to the electro-magnetic means.

16. An exposure control circuit comprising:
a. a diaphragm control means to control a diaphragm aperture value;
b. a diaphragm control circuit, containing:
1. a pulse forming circuit to form pulses with a prescribed uniform cycle,
2. a computation circuit to compute pulses from said pulse forming circuit, and
3. an electro-magnetic means to stop function of the diaphragm control means based on the computation value of said computation circuit;
c. a counter means coupled to said computation circuit, wherein said counter means reduces the number of pulses provided by said pulse forming means based on the amount of overlapping of shutter screens and transmit the same to said computation circuit.

* * * * *